(12) United States Patent
Roberts et al.

(10) Patent No.: US 12,487,898 B2
(45) Date of Patent: Dec. 2, 2025

(54) INJECTION FOR FAULT INSERTION AND INTEGRATION TESTING

(71) Applicant: Raytheon Company, Tewksbury, MA (US)

(72) Inventors: Aaron J. Roberts, Tucson, AZ (US); Andrew Fullerton, Sahuarita, AZ (US); Paul Kountz, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 29 days.

(21) Appl. No.: 18/670,636

(22) Filed: May 21, 2024

(65) Prior Publication Data

US 2025/0363024 A1 Nov. 27, 2025

(51) Int. Cl.
| | | |
|---|---|---|
| G06F 11/22 | (2006.01) | |
| G06F 11/26 | (2006.01) | |
| G06F 11/273 | (2006.01) | |

(52) U.S. Cl.
CPC .......... *G06F 11/261* (2013.01); *G06F 11/221* (2013.01); *G06F 11/2733* (2013.01)

(58) Field of Classification Search
CPC .. G06F 11/221; G06F 11/261; G06F 11/2733; G06F 13/4009; G06F 13/4013; G06F 13/4004; G06F 13/4027
See application file for complete search history.

(56) References Cited

U.S. PATENT DOCUMENTS

| | | |
|---|---|---|
| 6,212,224 B1 | 4/2001 | Cammarota et al. |
| 6,941,850 B1 | 9/2005 | McMahon |
| 8,032,685 B2 * | 10/2011 | Weber ................. G06F 13/4004 710/314 |
| 9,875,200 B2 | 1/2018 | Huber et al. |
| 9,916,277 B2 | 3/2018 | Hammel et al. |
| 11,928,015 B1 | 3/2024 | Krein et al. |

(Continued)

FOREIGN PATENT DOCUMENTS

EP 3535625 B1 2/2021

OTHER PUBLICATIONS

MIL-STD-1553 Message Transmission and Reception Using FPGA by Petr Topolsky Published in: 2019 International Conference on Military Technologies (ICMT) https://ieeexplore.IEEE.org/document/8870014 (Year: 2019).*

(Continued)

*Primary Examiner* — Joseph O Schell

(57) ABSTRACT

A method includes obtaining a portion of an original message in first bus traffic or second bus traffic transmitted over a communication bus by a bus controller or a remote terminal, respectively. The portion of the original message includes at least one bit. The method also includes, in response to determination that the portion of the obtained original message corresponds to a pattern in a pattern matching table, determining a specified bit that corresponds to the pattern based on a bit override table. The method further includes modifying the specified bit within the obtained original message to generate a modified message. In addition, the method includes outputting the modified message to the second bus bitwise when the original message is obtained from the first bus traffic or outputting the modified message to the first bus bitwise when the original message is obtained from the second bus traffic.

20 Claims, 12 Drawing Sheets

(56) References Cited

U.S. PATENT DOCUMENTS

| | | | |
|---|---|---|---|
| 12,124,367 B2* | 10/2024 | Wang | G06F 12/0253 |
| 2002/0196782 A1* | 12/2002 | Furukawa | H04M 7/128 |
| | | | 370/352 |
| 2006/0120354 A1* | 6/2006 | Sohn | H04L 12/5601 |
| | | | 370/352 |
| 2010/0161862 A1* | 6/2010 | Fredriksson | H04L 12/40013 |
| | | | 710/106 |
| 2013/0211813 A1 | 8/2013 | Campbell | |

OTHER PUBLICATIONS

International Search Report and Written Opinion of the International Searching Authority dated Jul. 30, 2025 in connection with International Patent Application No. PCT/US2025/029412, 12 pages.

* cited by examiner

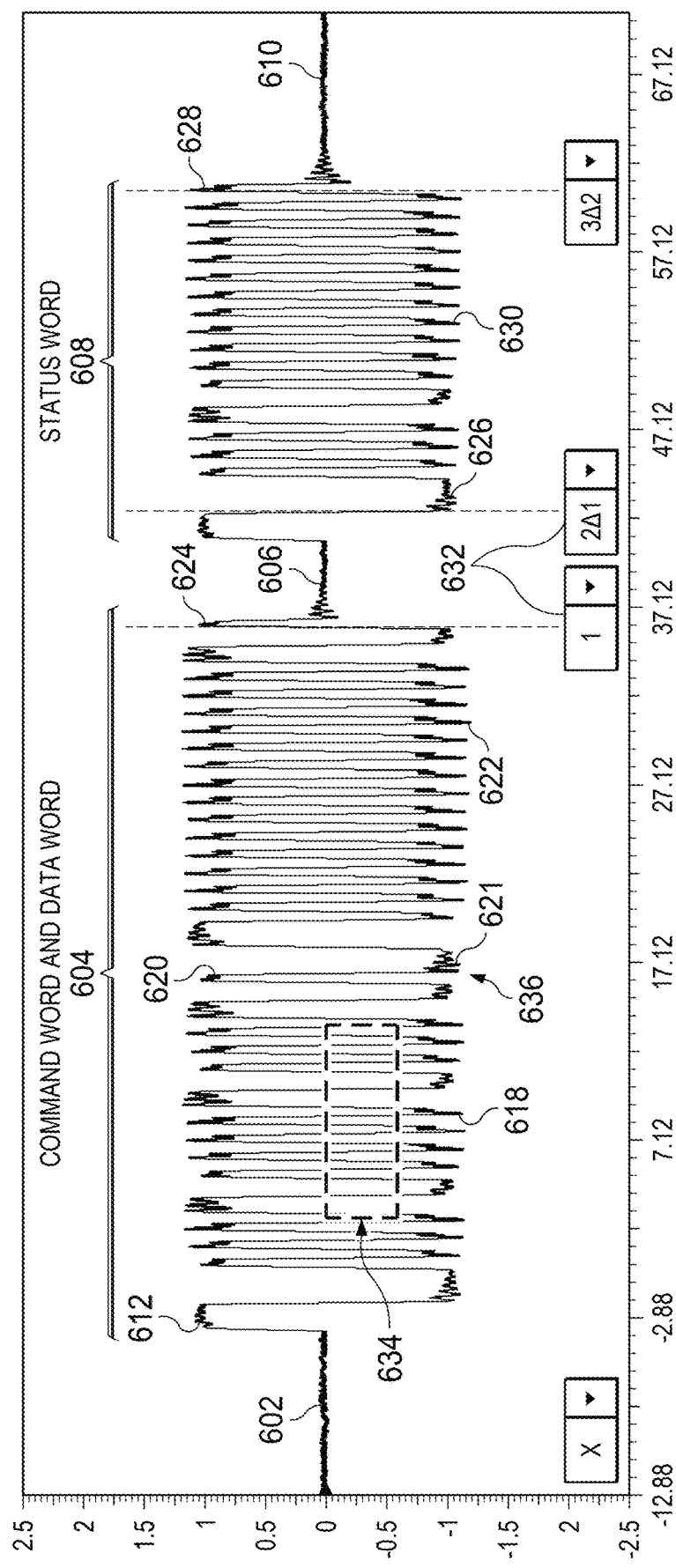

INJECTION FOR FAULT INSERTION AND INTEGRATION TESTING

TECHNICAL FIELD

This disclosure relates generally to computer and network monitoring systems. More specifically, this disclosure relates to injection for fault insertion and integration testing.

BACKGROUND

Various types of aircraft, such as airplanes, cargo planes, helicopters, and tilt-rotor aircraft, use communication buses to facilitate communications between various subsystems and other components within the aircraft. For example, aircraft can use communication buses to transport data between cockpit displays, flight and embedded control systems, navigation systems, communication systems, and (in the case of military aircraft) targeting systems and weapons systems. The same or similar types of communication buses can also be used in satellites, radars, weapons management systems, and other systems.

SUMMARY

This disclosure relates to injection for fault insertion and integration testing.

In a first embodiment, an apparatus includes a first interface configured to couple to a first communication bus and to receive first bus traffic transmitted by a bus controller over the first communication bus. The apparatus also includes a second interface configured to couple to a second communication bus and to receive second bus traffic transmitted by a remote terminal over the second communication bus. The apparatus further includes one or more processing devices configured to implement an injector that is configured to modify at least one of the first bus traffic and the second bus traffic received via the first interface and the second interface, respectively. To modify at least one of the first bus traffic and the second bus traffic, the injector is configured to obtain a portion of an original message in the first bus traffic or the second bus traffic, where the portion includes at least one bit. The injector is also configured, in response to a determination that the portion of the obtained original message corresponds to a pattern in a pattern matching table, to determine a specified bit that corresponds to the pattern based on a bit override table. The injector is further configured to modify the specified bit within the obtained original message to generate a modified message. In addition, the injector is configured to output the modified message to the second communication bus bitwise when the original message is obtained from the first bus traffic or output the modified message to the first communication bus bitwise when the original message is obtained from the second bus traffic.

In a second embodiment, a method includes receiving, via a first interface, first bus traffic transmitted by a bus controller over a first communication bus. The method also includes receiving, via a second interface, second bus traffic transmitted by a remote terminal over the second communication bus. The method further includes modifying, by an injector that includes one or more processing devices, at least one of the first bus traffic and the second bus traffic received via the first interface and the second interface, respectively. As part of modifying at least one of the first bus traffic and the second bus traffic, the method includes obtaining a portion of an original message in the first bus traffic or the second bus traffic, where the portion of the original message includes at least one bit. The method also includes, in response to a determination that the portion of the obtained original message corresponds to a pattern in a pattern matching table, determining a specified bit that corresponds to the pattern based on a bit override table. The method further includes modifying the specified bit within the obtained original message to generate a modified message. In addition, the method includes outputting the modified message to the second communication bus bitwise when the original message is obtained from the first bus traffic or outputting the modified message to the first communication bus bitwise when the original message is obtained from the second bus traffic.

In a third embodiment, a non-transitory machine readable medium contains instructions that when executed cause at least one processor to receive, via a first interface, first bus traffic transmitted by a bus controller over a first communication bus. The non-transitory machine readable medium also contains instructions that when executed cause the at least one processor to receive, via a second interface, second bus traffic transmitted by a remote terminal over the second communication bus. The non-transitory machine readable medium further contains instructions that when executed cause the at least one processor to modify at least one of the first bus traffic and the second bus traffic received via the first interface and the second interface, respectively. The instructions that when executed cause the at least one processor to modify at least one of the first bus traffic and the second bus traffic include instructions that when executed cause the at least one processor to obtain a portion of an original message in the first bus traffic or the second bus traffic, where the portion of the original message includes at least one bit. The instructions that when executed cause the at least one processor to modify at least one of the first bus traffic and the second bus traffic also include instructions that when executed cause the at least one processor, in response to a determination that the portion of the obtained original message corresponds to a pattern in a pattern matching table, to determine a specified bit that corresponds to the pattern based on a bit override table. The instructions that when executed cause the at least one processor to modify at least one of the first bus traffic and the second bus traffic further include instructions that when executed cause the at least one processor to modify the specified bit within the obtained original message to generate a modified message. In addition, the instructions that when executed cause the at least one processor to modify at least one of the first bus traffic and the second bus traffic include instructions that when executed cause the at least one processor to output the modified message to the second communication bus bitwise when the original message is obtained from the first bus traffic or output the modified message to the first communication bus bitwise when the original message is obtained from the second bus traffic.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 6A illustrates example recording of normal MIL-STD-1553 communication bus traffic, including highlights of timing where a data injector examines signals to meet MIL-STD-1553 timing requirements according to embodiments of this disclosure;

DETAILED DESCRIPTION

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, aircraft, satellites, radars, weapons management systems, and other systems typically include communication buses to facilitate communications between their various subsystems and other components. In an aircraft, for example, communication buses can be used to transport data between cockpit displays, flight and embedded control systems, navigation systems, communication systems, and targeting and weapons systems in military aircraft. An example type of communication buses include MIL-STD-1553 buses. Unfortunately, these types of communication buses have been developed without regard for controlling data without altering the messaging timing, or altering the overall bus content.

In order to fully test interfaces on a MIL-STD-1553 bus, fault injection and OFF nominal testing is performed. These tests include testing safety messaging, performing boundary checks, and testing for invalid data responses. Unfortunately, testing according to a current approach uses dual channel MIL-STD-1553 adaptors is an approach that no longer represents MIL-STD-1553 traffic and requires polling. Unfortunately, another current approach includes changing missile or platform SW, which may invalidate testing and requires a deployed SW development environment. This disclosure provides MIL-STD-1553 injection for fault insertion and integration testing that overcomes these or other issues.

Figure 1:
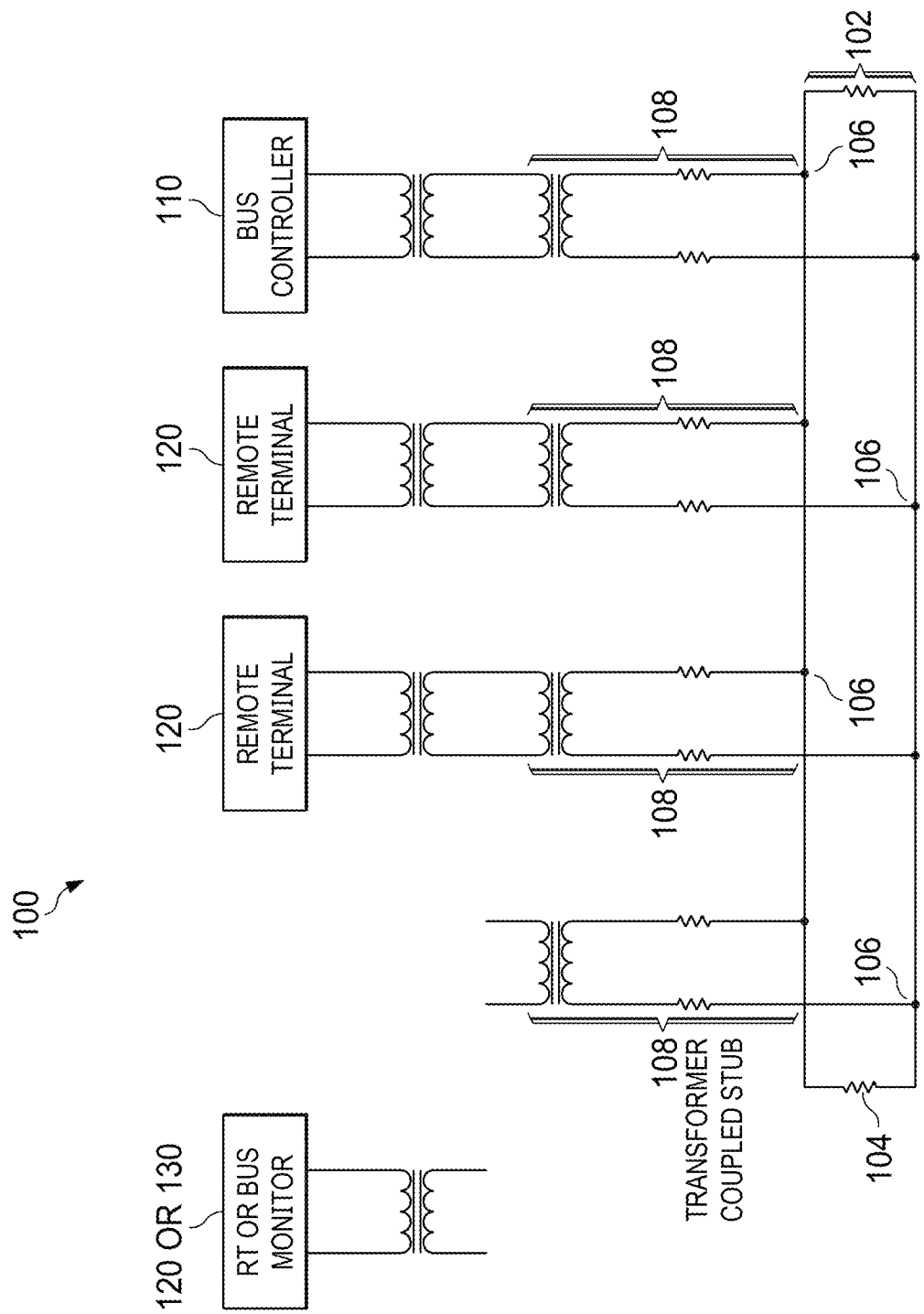
FIG. 1 illustrates an example normal architecture for a MIL-STD-1553 bus.

FIG. 1 illustrates an example normal architecture 100 for a MIL-STD-1553 bus 102. The bus 102 is differential bus that functions as a communication bus. Each end of the bus 102 includes a bus terminator 104. The bus 102 includes a limited number (N) of connection points 106, for example, N=4. Each of the N connection points includes a transformer coupled stub 108. Only one bus controller (BC) 110 is connected to the bus 102 and is connected at one of the connection points 106 through a corresponding stub 108. Once the bus 102 is installed into an aircraft, a connection point 106 (including a corresponding stub 108) may be difficult to reach or difficult to access. The BC 110 can represent or can be incorporated into aircraft avionics. That is, an aircraft platform can include a MIL-STD-1553 BC 110 for sending messages (such as receive ('R') messages) to a weapon and receiving messages (such as transmit ('T') messages) from the weapon via the bus 102. The remainder (N−1) of the connection points 106 can be coupled to a remote terminal (RT) 120, which can represent a weapon carried onboard an aircraft, or can be coupled to a bus monitor 130. The BC 110 can communication with each of the N−1 RTs 120 connected to the bus 102 using a communication protocol with which the bus 102 is compatible, such as a military standard MIL-STD-1553 protocol. In some instances of time, one or more among the remainder (N−1) of the connection points 106 have an open transformer coupled stub 108, which is not currently connected to an RT 120. An external device, such as the RT 120 or bus monitor 130, configured to communicably couple to the bus 102 can physically connect at the transformer coupled stub 108 that is open (namely, unoccupied).

Figure 2:
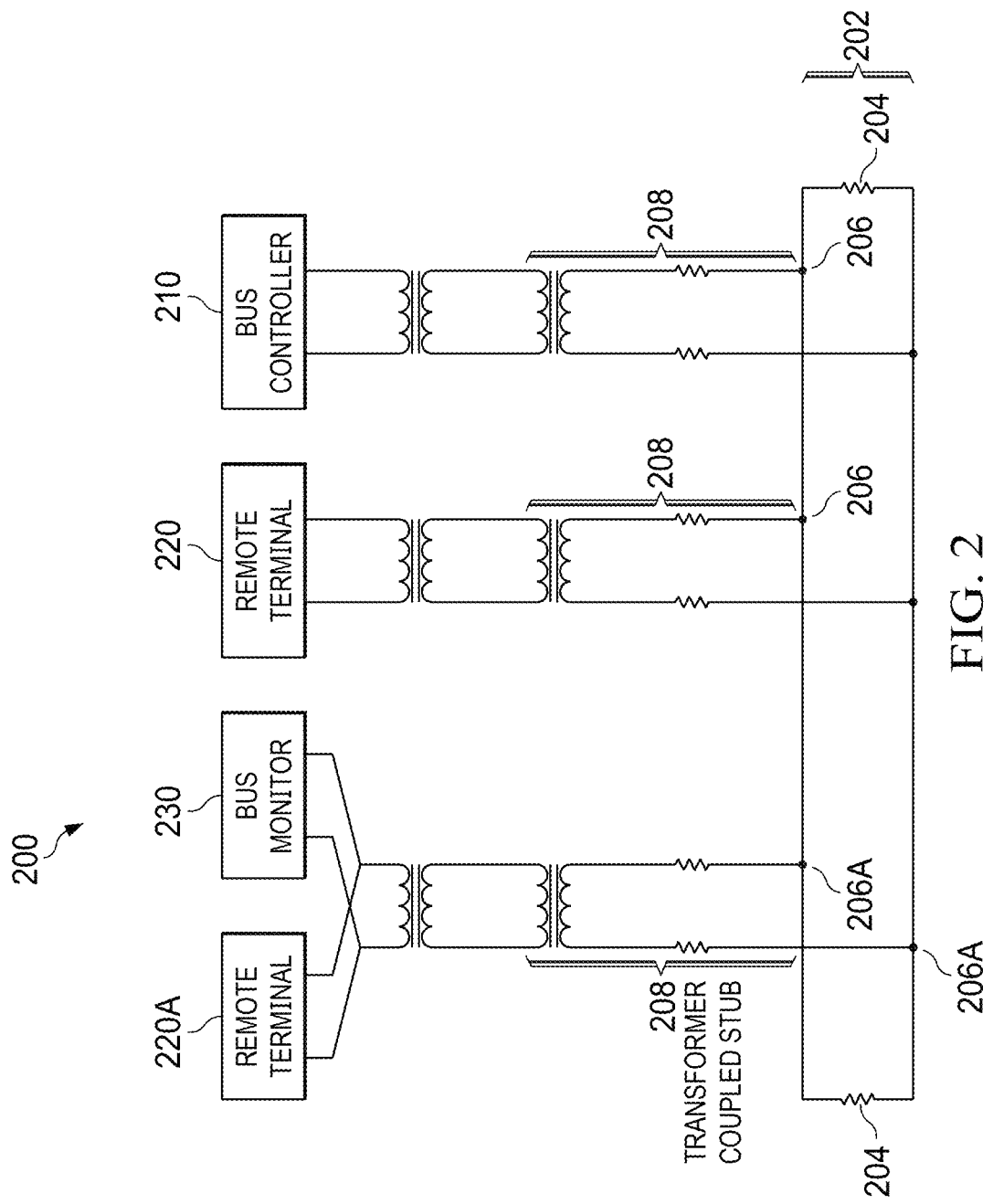
FIG. 2 illustrates an example incorrect bus monitor architecture for a MIL-STD-1553 bus.

FIG. 2 illustrates an example incorrect bus monitor architecture 200 for a MIL-STD-1553 bus. The bus 202, bus terminators 204, connection points 206 with corresponding transformer coupled stubs 208, BC 210 and RTs 220 of FIG. 2 can be the same as or similar to corresponding components 102, 104, 106, 108, 110, and 120 of FIG. 1, respectively. A problem with the incorrect bus monitor architecture 200 is that a single connection point 206A is connected to two devices, namely, an RT 220A and a bus monitor 230. Such two devices connected to a single stub 208 violates the electrical signal requirements of the MIL-STD-1553.

Figure 3A:
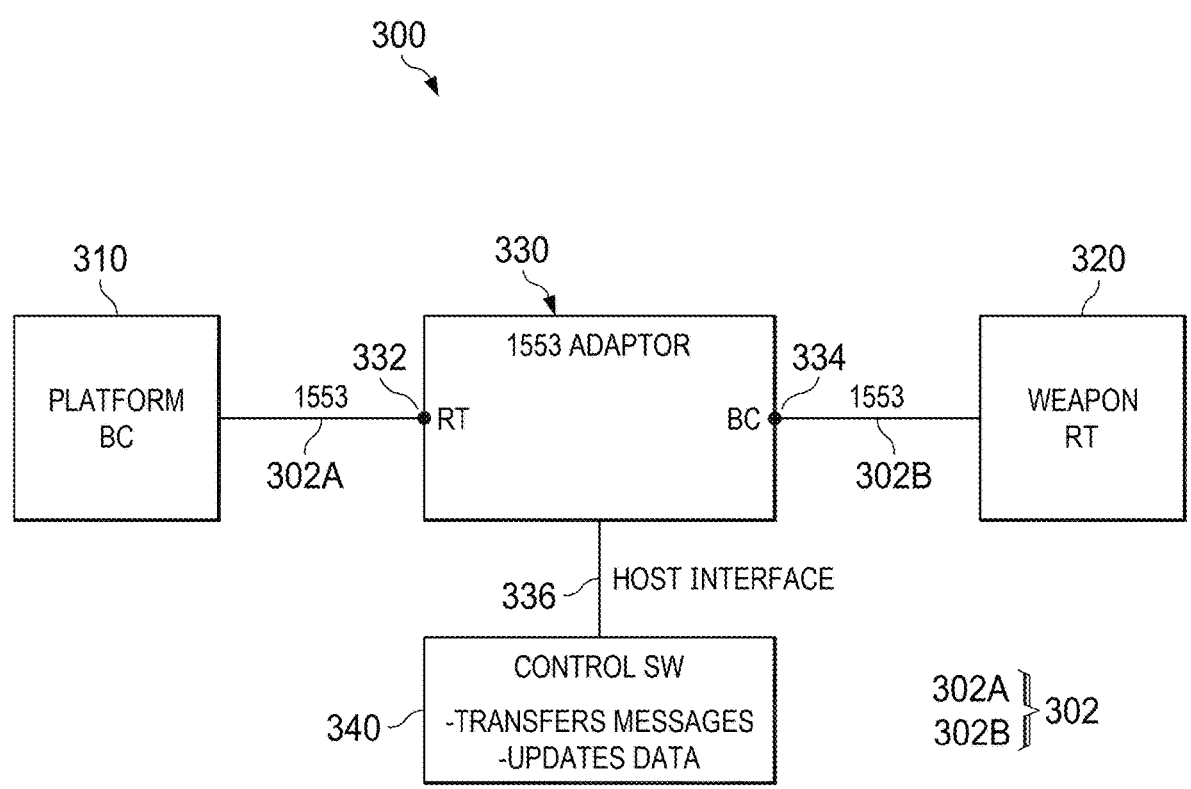
FIGS. 3A, 3B, and 3C illustrate various views of an example architecture for a bus monitoring system with fault injection that includes a dual channel adaptor and control software.
Figure 3B:
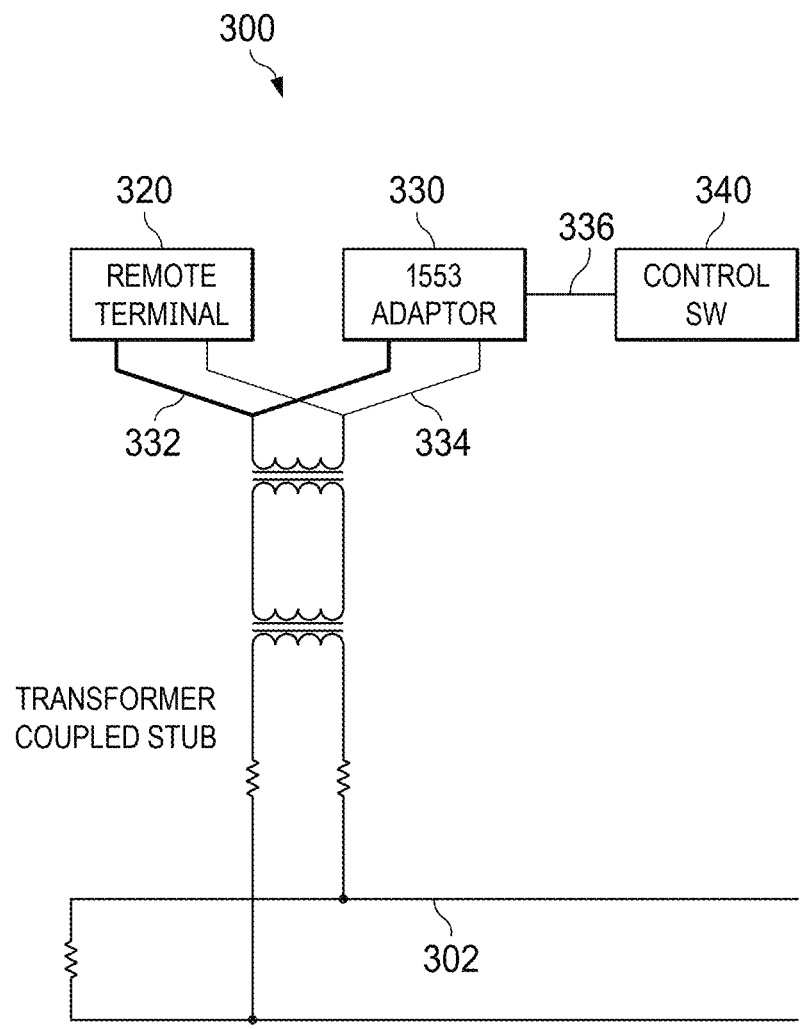
Figure 3C:
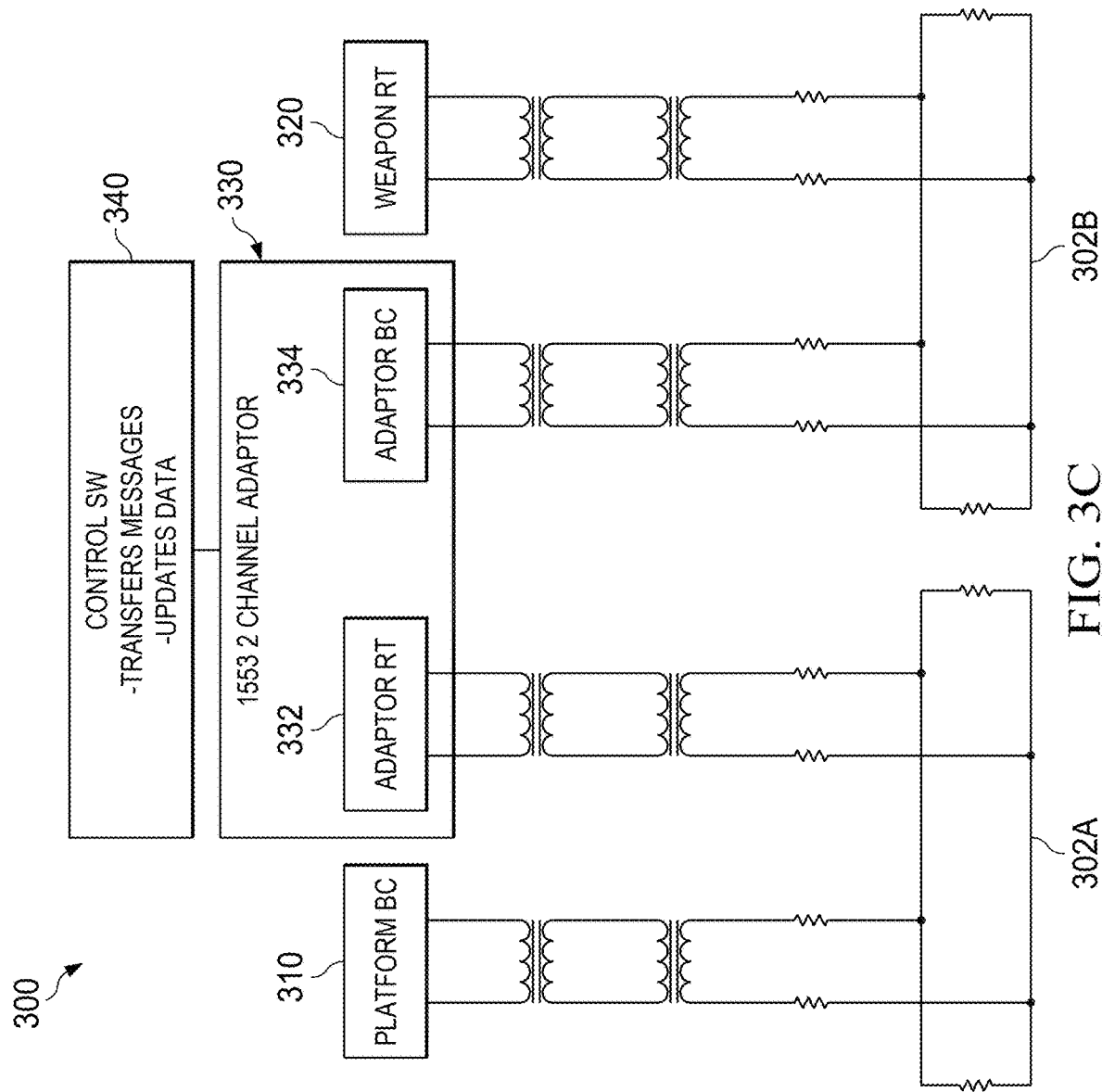

FIGS. 3A, 3B, and 3C (generally FIG. 3) illustrate various views of an example architecture for a bus monitoring system 300 that includes a dual channel adaptor and control software (SW). The embodiment of the bus monitoring system 300 shown in FIG. 3 is for illustration only, and other embodiments could be used without departing from the scope of this disclosure. The system 300 includes a communication bus 302, a BC 310, and an RT 320 which can be the same as or similar to corresponding components 102, 110, and 120 of FIG. 1.

The system 300 includes the dual channel adaptor 330 connected to the BC 310 via an RT-replica interface 332 associated with a first channel, connected to the RT 320 via a BC-replica interface 334 associated with a second channel, and connected to a control SW 340 via a host interface 336. The system 300 of FIG. 3 represents a valid way of injecting data, and the system 300 could be used to monitor data as well, but has the issue of introducing different messaging rates. The adaptor 330 can be the same as or similar to the bus monitor 230 of FIG. 2, as such, the adaptor 330 can be incorrectly coupled to the bus 302. That is, the communication bus 302 refers to a logical bus formed from copying data from a first bus 302a to a second bus 302b, and the adaptor 330 and the RT 320 can be coupled to a single connection point on the bus, such as the connection point 206A of FIG. 2. Using the adaptor 330 to only perform monitoring indicates the adaptor 330 would be connected using only half of its connections. Additionally, the system 300 includes the control SW 340 that transfers messages and updates data.

In order to test communications of the BC 310 and RT 320, the adaptor 330 is required to perform polling of T messages to the RT 320. The adaptor 330 records traffic on the bus 302 by buffering an incoming message in its entirety, analyzing the entire message, and then outputting an outgoing message to the bus 302 as traffic. By buffering an entire message, the data within the message becomes stale. Particularly, the data is stale by 692 microseconds (us or μs) or longer. For example, the data can be stale by a minimum of 692 microseconds (us or μs) plus two times the message transfer time over the Host Interface 336 and the processing time used by the Control SW 340. Message rates and data output from the adaptor 330 are no longer representative of real use, as the adaptor 330 has to poll at a rate of at least two times for each required T message and may not capture platform unique behaviors.

In order to test communications of the BC 310 and RT 320, the adaptor 330 needs dual channels (such as associated with the RT-replica and BC-replica interfaces 332 and 334). Each MIL-STD-1553 adaptor adds additional computational cost to the system 300. In order to process message traffic from the dual channel adaptor 330, the SW 340 must include additional complexity (such as increased computational complexity). That is, the SW 340 processes the messages buffered in the adaptor 330 or the messages recorded by the multiple MIL-STD-1553 adaptors.

A system dependent small delay is introduced in order for the adaptor 330 to retransmit an R message from a first bus 302a to a second bus 302b. The first and second buses can be referred to as the logical communication bus 302. Retransmission adds unaccounted data latency for time-stamped data.

Although FIG. 3 shows one example architecture for a bus monitoring system 300 that includes a dual channel adaptor 330 and control SW 340, this approach of using the system 300 is associated with polling problems, problems of data staleness due to buffering an entire message, and retransmit delay problems. Another approach of changing the embedded SW of the RT of 320 (or of the RT 120 of FIG. 1) is associated with other problems, such as: no longer running 'real' code; unavailable reprogramming pins/port access may prevent any changing of the embedded SW; additional time to swap between versions to support verification events; and a requirement for a deployed SW development environment.

Figure 4:
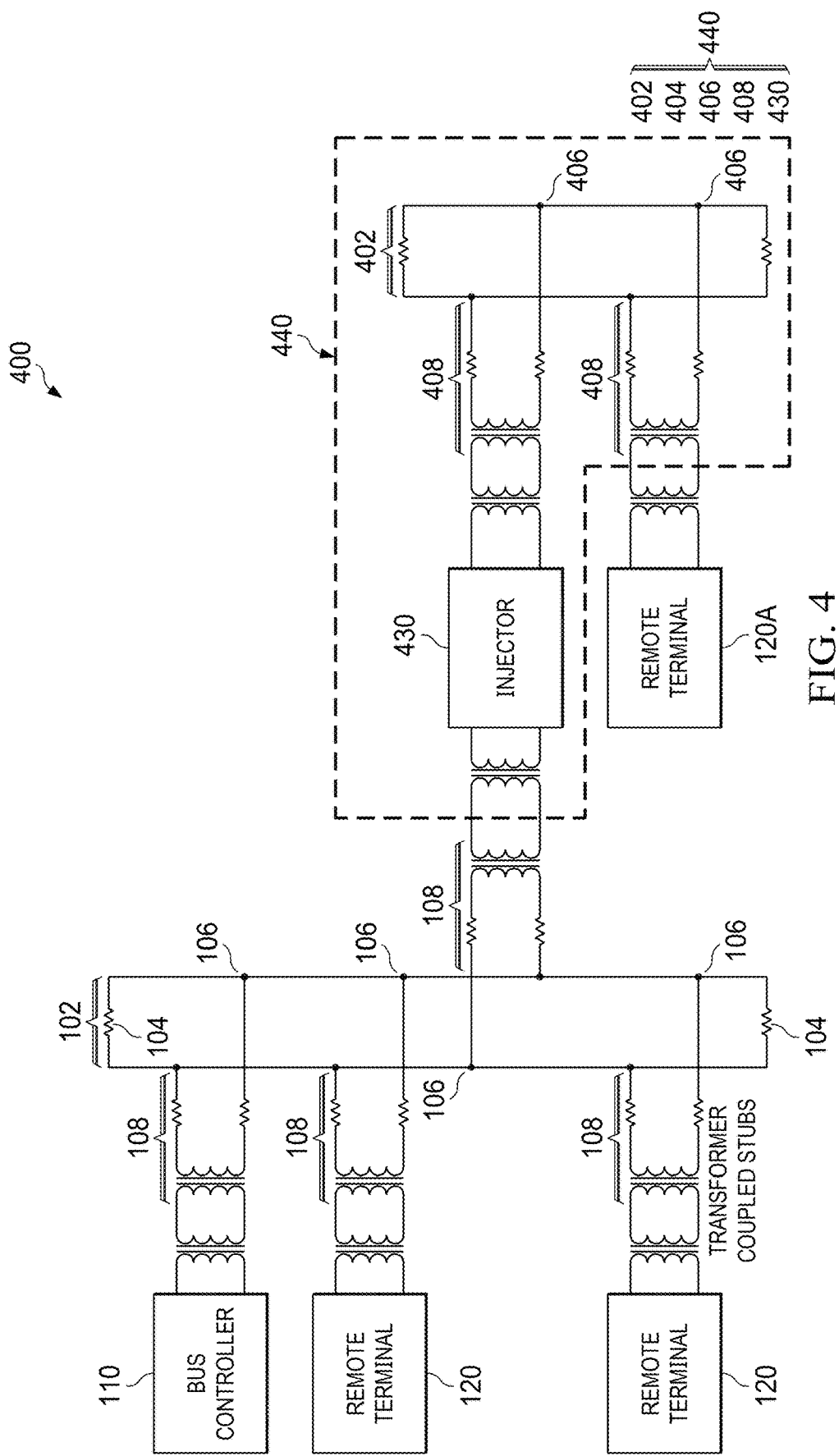
FIG. 4 illustrates an example normal architecture for a MIL-STD-1553 bus that includes a data injector with a secondary MIL-STD-1553 bus according to embodiments of this disclosure.

FIG. 4 illustrates an example normal architecture 400 for a '1553' bus that includes a data injector with a secondary '1553' bus according to embodiments of this disclosure. The embodiment of the normal architecture 400 shown in FIG. 4 is for illustration only, and other embodiments could be used without departing from the scope of this disclosure. The bus 102, bus terminators 104, connection points 106 with corresponding transformer coupled stubs 208, BC 110 and RTs 120 of the normal architecture 100 of FIG. 1 can be the same in the normal architecture 400 of FIG. 4.

Within the normal architecture 400, a sub-system 440 is composed from a secondary '1553' bus 402, bus terminators 404, at least two connection points 406 with corresponding stubs 408, and an injector 430. The normal architecture 400 of FIG. 4 provides a technical advantage, in that any connection point 106 (though a corresponding stub 108) can be connect to an injector 430, which is concurrently connected to a secondary '1553' bus 402 at a connection point 406 through a corresponding stub 408. The secondary '1553' bus 402 can be similar to the bus 102 and can include bus terminators 404 and connection points 406 with corresponding transformer coupled subs 408 similar to corresponding components 102, 104, 106, and 108 of the primary or first '1553' bus 102. That is, an RT 120A and operates in a same manner and couples to a connection point 406 of the secondary '1553' bus 402 in the same way as to a connection point 106 of the primary '1553' bus 102. In some embodiments, the sub-system 440 is limited to a single RT 120A.

The normal architecture 400 of FIG. 4 provides a technical benefit in that missile and platform integration can be accelerated. For example, when installed onboard an aircraft, the secondary '1553' bus 402 and the corresponding connection points 406 can be easier to access than the connection points 106 of the primary or first '1553' bus 102.

The normal architecture 400 of FIG. 4 is not only useful in a field deployment environment, but is also useful in an aircraft integration laboratory environment. It is common for aircraft integration laboratories, where BCs and RTs undergo pre-deployment testing, to not have access to an additional bus stub. As a solution to this problem, the injector 500 provides the ability to monitor a stub connection (such as 106 and 108 of the first bus 102) with an RT 120A connected to that stub connection (via stub connection at the second bus 402). The normal architecture 400 including the subssystem 440 does not violate the MIL-STD-1553 requirements. Particularly, the normal architecture 400 does not extend primary bus 102. Unlike the two devices connected to a single stub connection 206a in the incorrect bus monitor architecture 200 of FIG. 2, the normal architecture 400 does not connect additional devices to a single stub connection 106 or 406.

Figure 5:
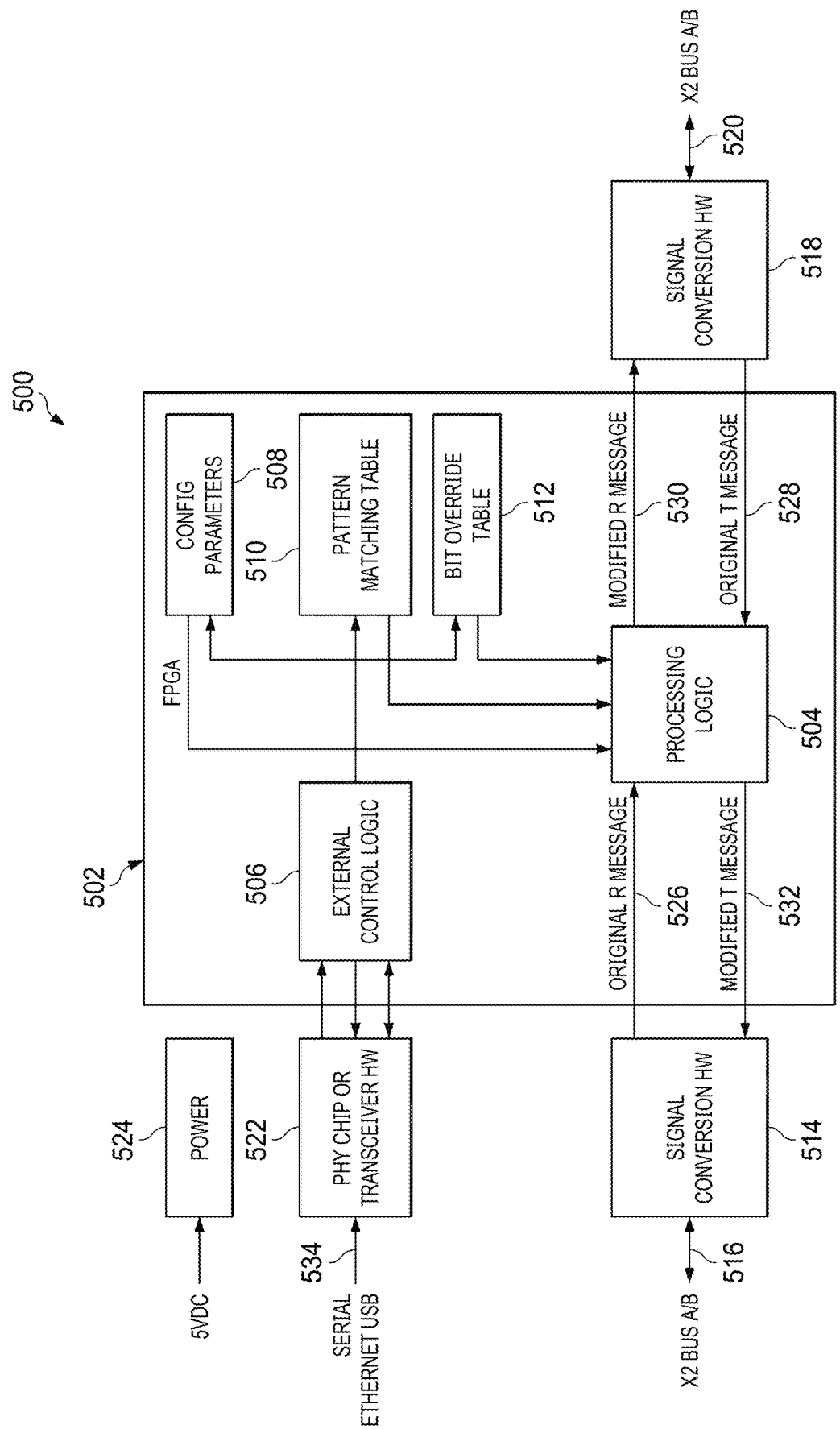
FIG. 5 illustrates an example architecture for a data injector according to embodiments of this disclosure.

FIG. 5 illustrates an example architecture for a data injector 500 according to embodiments of this disclosure. The data injector 500 can be the same as the data injector 430 of FIG. 4. The embodiment of the data injector 500 shown in FIG. 5 is for illustration only, and other embodiments could be used without departing from the scope of this disclosure.

Due to the MIL-STD-1553 design for the normal bus and communication protocol, it is not possible to monitor communication on a bus stub connection point 106 between the BC 110 and the RT 120, without violating the electrical signal requirements of the MIL-STD-1553 communication protocol. This data injector 500 enables monitoring and changing the data for the purposes of interface testing and fault injection without violating the MIL-STD-1553, but the data injector 500 would not be connected at bus stub connection points 106.

In the case of the normal architecture 100 of FIG. 1 and the incorrect bus monitor architecture 200 of FIG. 2, bus monitoring can be performed using a separate bus stub (such as installing a bus monitor 230 of FIG. 2 as a replacement of an RT 120 at one among the remainder (N−1) of the connection points 106 in FIG. 1) to monitor traffic on a bus to which a reduced number (N−2) of RTs are connected, but there is not a valid way to monitor a specific RT 120 attached to a stub. As described above, the incorrect bus monitor architecture 200 of FIG. 2, the bus monitoring system 300 of FIG. 3, and an approach of changing an embedded SW are various technologies that are fast enough to monitor and recreate the electrical signaling onto a second virtual bus. Updating the data in real-time, without altering the inter-message timing or bus loading is not a capability that exists from any commercial products. The problems of these technologies include '1553' message transmissions at the message level, not the Manchester encoded bit level (herein referred to as "bitwise" transmission).

The data injector 500 includes one or more processing devices 502, which can be a field programmable gate array (FPGA) that includes a processing logic 504, an external control logic 506, and a set of configuration parameters 508, a pattern matching table 510, and a BIT override table 512. The data injector 500 includes a first interface 514 configured to couple to a redundant first communication bus 516, and a second interface 518 configured to couple to a redundant second communication bus 520. Each of the first interface 514 and the second interface 518 can include signal conversion hardware. The redundant first communication bus 516 can be the primary '1553' bus 102 of FIG. 4 (labeled as Bus A) and an identical redundant instance of the primary '1553' bus 102 (labeled as Bus B). Similarly, the redundant second communication bus 520 can be the secondary '1553' bus 402 of FIG. 4 (labeled as Bus A) and an identical redundant instance of the secondary '1553' bus 402 (labeled as Bus B). The data injector 500 includes a third interface 522 configured to receive a set of configuration parameters from an external device. For example, the third interface 522 include hardware of a transceiver, or can be physical chip, or can be a data port such as a serial port, an ethernet port, or a universal serial bus (USB) port. The data injector 500 includes a power source 524, for example, a 5 volts direct current electrical power supply.

Within the data injector 500, a high speed FPGA (such as the one or more processing devices 502) and multiple differential signal devices (namely, first and second interfaces 514 and 518) are used to create a virtual RT, a virtual BC, and a secondary '1553' bus. This data injector 500 is inserted on the stub connection of the primary '1553' bus 102 where an RT 120 or other '1553' device would be connected. The data injector 500 is a device that monitors the signals on both the original primary bus 516 and the new secondary bus 520, recreating or updating the signals on the opposite bus as needed. The data injector 500 provides bitwise transmission of an original message, thereby enabling '1553' message transmissions at the Manchester encoded bit level as described more particularly below.

The first interface 514 is configured to receive (or intercept) first bus traffic transmitted by a bus controller (such as BC 110) over the first communication bus 516. The first bus traffic can include an original R message 526, for example, transmitted from the BC 110 and intended to be received by the RT 120A of FIG. 4.

Similarly, the second interface 518 is configured to receive (or intercept) second bus traffic transmitted by an RT (such as RT 120A) over the second communication bus 520. The second bus traffic can include an original T message 528, for example, transmitted from the RT 120A of FIG. 4 and intended to be received by the BC 110.

The FPGA 502 is configured to execute the functions of the injector 500, such as to modify first bus traffic received via the first interface and the second bus traffic received via the second interface. To modify the first and second bus traffics, the processing logic 504 obtains a portion of an original message that is incoming on the bus, such as a portion of the original R message 526 in the first bus traffic or a portion of the original T message 528 in the second bus traffic. The obtained portion of the original message includes at least one bit. As an example, the bit rate can be 1-bit per μs, and the obtained portion of the original message can include an initial 1 microsecond at the start of bus traffic. As another example, the portion of the original message can include 3 microseconds of traffic.

The processing logic 504 modifies the specified bit within the incoming original message to generate a modified message. Particularly, when the FPGA 502 intercepts traffic on the first bus 516, the processing logic 504 modifies the specified bit within the incoming original R message 526 to generate the modified R message 530. Alternatively, when the FPGA 502 intercepts traffic on the second bus 520, the processing logic 504 modifies the specified bit within the incoming original T message 528 to generate the modified T message 532. Modifying a specified bit includes flipping a 0-bit within the original message to a 1-bit within the modified message, or vice versa. The modified messages 530 and 532 that the processing logic 504 generates are in compliance with the MIL-STD-1553.

The processing logic 504 is not required to analyze or modify every original message incoming via the first and second buses 516 and 520. The processing logic 504, in response to a determination that the portion of the obtained original message corresponds to a pattern in a pattern matching table 510, determines a specified bit that corresponds to the pattern based on a bit override table 512.

In some embodiments, the configuration parameters 508 define one or more conditions (referred to as flip conditions), which when satisfied, trigger the processing logic 504 to compare patterns stored in the pattern matching table 510 to the obtained portion of the original message 526 or 528. That is, the configuration parameters 508 control when the pattern matching table 510 operates on incoming traffic. In some embodiments, the configuration parameters 508 control when the pattern matching table 510 is accessible to the processing logic 504. For example, the configuration parameters 508 can define a condition that is satisfied whenever the original message is incoming from the second bus 520, as such, the configuration parameters 508 cause the processing logic 504 to search every original T message for a pattern that corresponds to (such as matches) at least one of the multiple patterns in the pattern matching table 510. As another example, the configuration parameters 508 can define a condition that is satisfied for every other original message incoming from the second bus 520. The configuration parameters 508 can define a condition that is satisfied when a certain type of message is incoming, for example, an RT-to-RT transfer message. The configuration parameters 508 can define a condition that is satisfied when a certain type of command word, data word, or status word is incoming. When all of the flip conditions are not satisfied, the injector 500 does not modify the original message, and instead forwards the portion of the original message to the opposite bus.

The set of configuration parameters 508 can be received from an external device, such as a computer that updates the configuration of the data injector 500 for performing monitoring. The external device can be connected to the data injector 500 via a data connection 534, such as a data cable or wireless communication connection.

The external control logic 506 can route data received though the data connection 534 and the third interface 522 to update the set of configuration parameters 508, to update the pattern matching table 510, or to update the BIT override table 512. Similarly, the external control logic 506 can enable the external device, which is coupled to the other end of the data connection 534, to view the current (pre-update) content within the configuration parameters 508, pattern matching table 510, and BIT override table 512.

The pattern matching table 510 controls which types of message that the processing logic 504 modifies. Within the pattern matching table 510, a pattern can be a sequence of bits at a particular location within the original message. Within the pattern matching table 510, each pattern corresponds to a specified bit or specified set of bits to modify (such as flip). For example, a pattern can correspond to the parity bit that precedes a 16-bit command word, the parity bit that follows the end of a 16-bit command word, the parity bit that follows the end of a 16-bit data word, or the $M^{th}$ bit within a 16-bit status word. When none of the patterns in the pattern matching table correspond to the obtained portion of the original message, the injector 500 does not modify the original message, and instead forwards the portion of the original message to the opposite bus.

When the original message is incoming from first bus 516 traffic, the injector 500 outputs the modified message to the second bus 520 bitwise. For example, the second interface 518 outputs the modified R message 530 to the second bus 520 as a bitwise transmission. Alternatively, when the original message is incoming from the second bus 520 traffic, the injector 500 outputs the modified message to the first bus 516 bitwise. That is, the first interface 514 outputs the modified T message 532 to the first bus 516 as a bitwise transmission. By operating the FPGA 502 between the BC and RT to monitor and update message transmissions in real time, the injector 500 provides the technical advantages of not violating timing requirements of the '1553' standard.

The data injector 500 provides several technical benefits, including operating based on patterns in the pattern matching table 510, as not just based on communication protocol. The data injector 500 is controllable via a common interface. The injector 500 can communication with BC and RT devices that are commercial off the shelf (COTS) devices without custom configurations to the COTS BC or COTS RT. The injector 500 is reusable across various programs. The injector 500 performs parity bit recalculation and can update a parity bit. The injector 500 can recalculate a message checksum. The injector 500 can perform retransmission within less than or equal to 2 microseconds of delay (such as near real-time), which ensures that the retransmissions remain in compliance to MIL-STD-1553, and which ensures that data within the retransmission are not stale.

In some embodiments, the injector 500 operates based on an assumption that a worst case RT response time is 10 us. In some embodiments, the injector 500 operates such that a worst retransmission delay (such as longest latency) is 1.5 us.

Figure 6B:
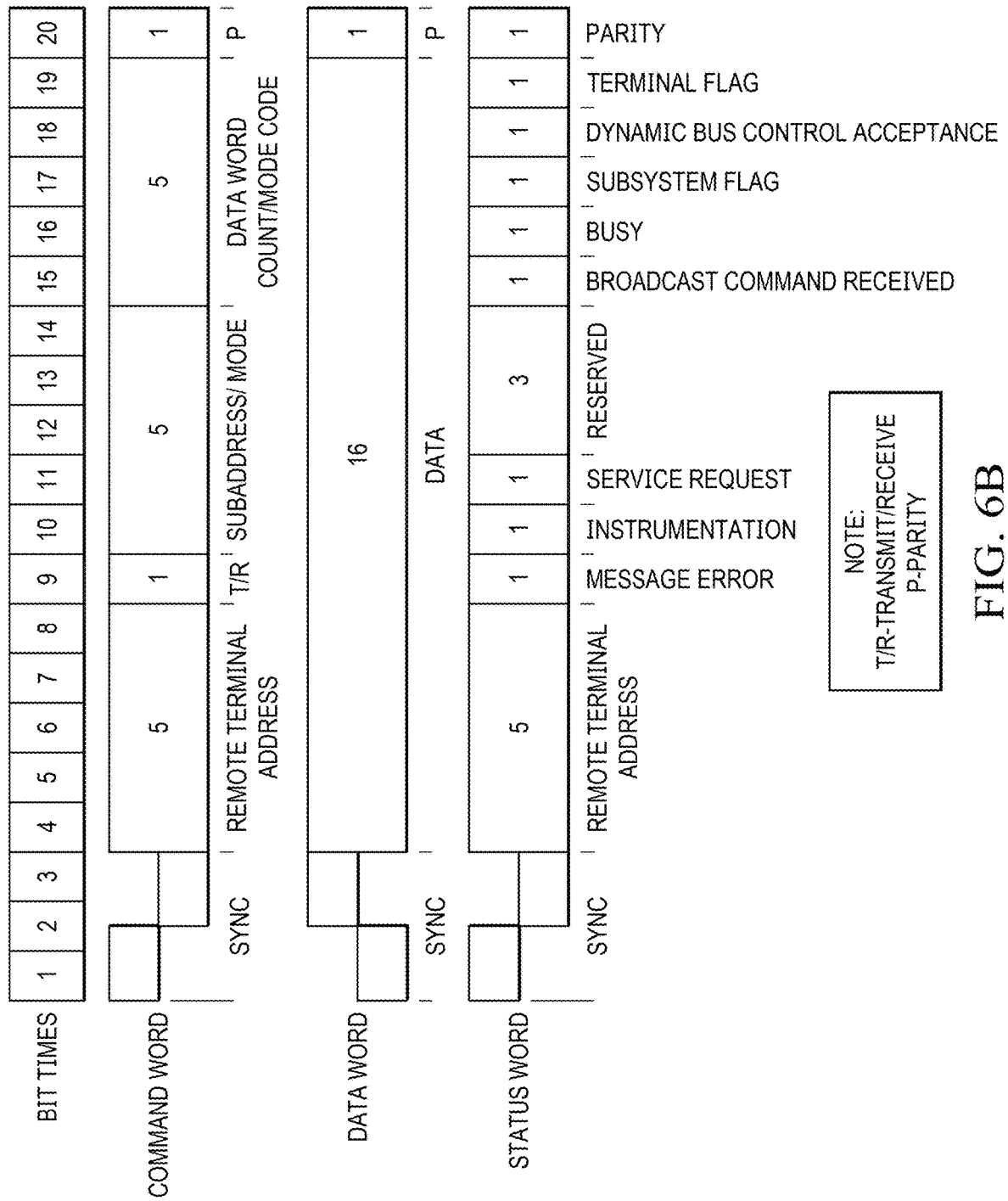
FIG. 6B illustrates MIL-STD-1553 word formats.

FIG. 6A illustrates an example recording of normal MIL-STD-1553 communication bus traffic, including highlights of timing where a data injector 500 examines signals to meet MIL-STD-1553 timing requirements according to embodiments of this disclosure. FIG. 6B illustrates MIL-STD-1553 word formats with which the communications and words within the bus traffic 600 of FIG. 6A comply. The bus traffic 600 is shown in the form of a timeline of analog signals in accordance with Manchester coding. The embodiment of the bus traffic 600 shown in FIG. 6 is for illustration only, and other embodiments could be used without departing from the scope of this disclosure.

The bus traffic 600 includes an idle period 602 of no traffic followed by an 'R' message 604 transmitted by a BC (such as BC 110), followed by a second idle period 606 of no traffic, followed by status word 608, and a final idle period 610 of no traffic. The status word 608 indicates status of 'R' message receipt. The entire 'R' message 604 from a BC can include a sequence of a 3 us sync pulse 612, a 16-bit command word 618, a parity bit 620 at the end of the command word 618, a sync pulse 621 at the beginning of a 16-bit data word 622 from the BC, and a parity bit 624 at the end of the data word 622. In accordance with the MIL-STD-1553 protocol, a SYNC (which can be a pulse including multiple bits) is required at the start of every command word, data word, and status word and occurs at the beginning of the word. Also in accordance with the MIL-STD-1553 protocol, a PARITY bit is required for every command word, data word, and status word and occurs at the end of the word. The entire 'status word 608 from an RT can include a 3 µs sync pulse 626, a 16-bit grouping 630, and a parity bit 628 at the end of the status word 608.

This R message 604 is sent to the RT (such as RT 120A), and might notify a missile weapon saying, "Here is your data." The sync pulse 612 includes a 1.5 µs high and a 1.5 µs low. The sync pulse 612 indicates the start of a message transmission, such as start of the command word 618. A wait time interval 632 begins at the end of the R message 604, and endures while the BC waits to receive a reply back from the RT. The length of the waiting interval 632 can be defined by the communication protocol (such as '1553' protocol). The status word 608 transmission can start before the waiting interval 632 expires. The status word 608 is data as a reply back to (such as data requested back from) the RT. The status word 608 includes a 16-bit grouping 630 that is transmitted from the RT to the BC as reply to the R message 604.

The injector 500 tracks the sync pulses 612, 621, and 626. The injector 500 tracks and updates the delay from start of the waiting interval 632 until the start of the status word 608, which happens to be the duration of the second idle period 606 in this example. The injector 500 determines that a portion 634 of the R message 604 matches a pattern in the pattern matching table 510 and changes the specified bits corresponding to the pattern matched. In this example, the R message 604 includes a portion 634 that correspond to (such as matches) a pattern that corresponds to (such as is linked to) a specified bit 636 in the BIT override table 512. In this example, the specified bit 636 that the injector 500 updates/modifies is the parity bit 620. In another example, the specified bit that the injector 500 updates/modifies could be different, such as a bit within a SYNC pulse.

Because the injector 500 operates at the signaling level (such as bitwise), the bus traffic 600 appears to the BC as if the BC is communicating directly with the RT, and the bus traffic 600 appears to the RT as if the RT is communicating directly with the BC. Both the RT and BC are unable to distinguish original unmodified messages 526 and 528 from modified messages 530 and 532. The injector 500 enables real time (or near real time) message modification at the bit level, which is a technical improvement over the adaptor 330 of FIG. 3 that first waits to receive and then processes an entire message.

Figure 7:
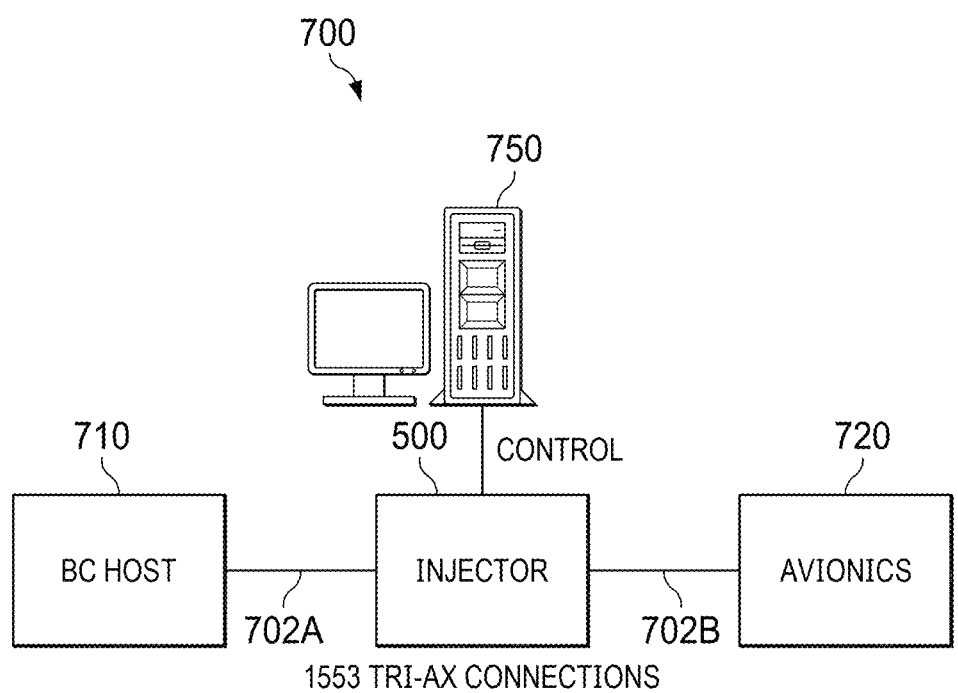
FIG. 7 illustrates a MIL-STD-1553 injection for fault insertion and integration testing architecture that includes a data injector according to embodiments of this disclosure.

FIG. 7 illustrates a MIL-STD-1553 injection for fault insertion and integration testing architecture 700 that includes a data injector 500 according to embodiments of this disclosure. In this example, the architecture 700 is used in an example aircraft integration laboratory environment. The embodiment of the architecture 700 shown in FIG. 7 is for illustration only, and other embodiments could be used without departing from the scope of this disclosure. The architecture 700 includes a primary communication bus 702A, a secondary communication bus 702B, a BC 710, and an RT 720 (labeled Avionics) which can be the same as or similar to corresponding components 102, 402, 110, and 120A of FIG. 4.

The external device 750 can be a desktop computer or laptop computer of an engineer or lab worker who is testing the BC 10 and RT 720 using the tri-ax connection of the data injector 500. The external device 750 can display a timeline of the MIL-STD-1553 bus traffic (such as the bus traffic 600) controlled by a data injector 500.

Figure 8:
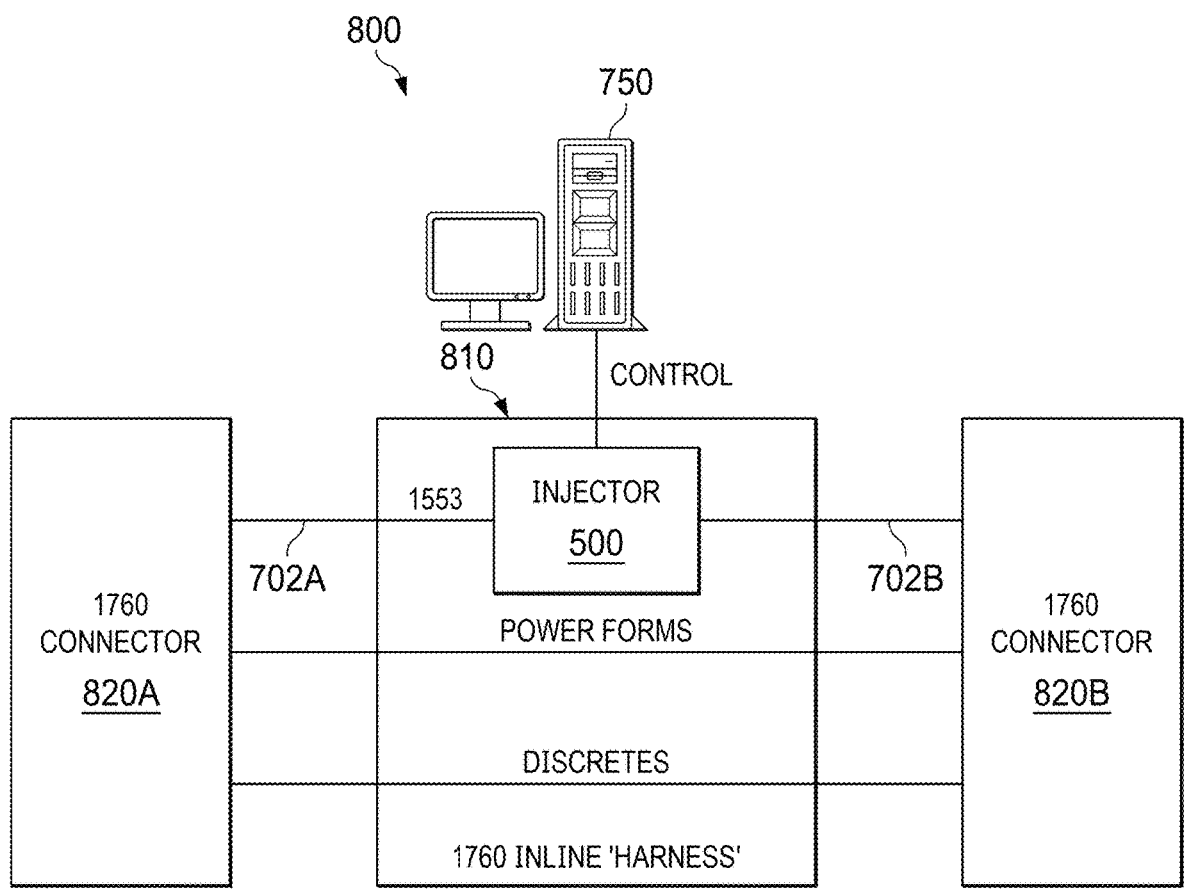
FIG. 8 illustrates a production test architecture for testing the data injector of FIG. 5 incorporated into a MIL-STD-1760 harness according to embodiments of this disclosure.

FIG. 8 illustrates a production test architecture 800 for testing the data injector 500 of FIG. 5 incorporated into a MIL-STD-1760 harness according to embodiments of this disclosure. The embodiment of the production test architecture 800 shown in FIG. 8 is for illustration only, and other embodiments could be used without departing from the scope of this disclosure. The production test architecture 800 is an example of how the actual compact implementation is tactical. The production test architecture 800 is similar to and includes some components 702A-702B, 710, and 750 from the testing architecture 700 of FIG. 7. The production test architecture 800 includes a MIL-STD-1760 inline harness 810 that includes the data injector 500, power forms, and discretes. In some embodiments, the harness 810 includes at least a portion of the primary communication bus 702A and at least a portion of the secondary communication bus 702B. The two ends of the harness 810 include a MIL-STD-1760 connectors 820A and 820B, respectively.

Figure 9:
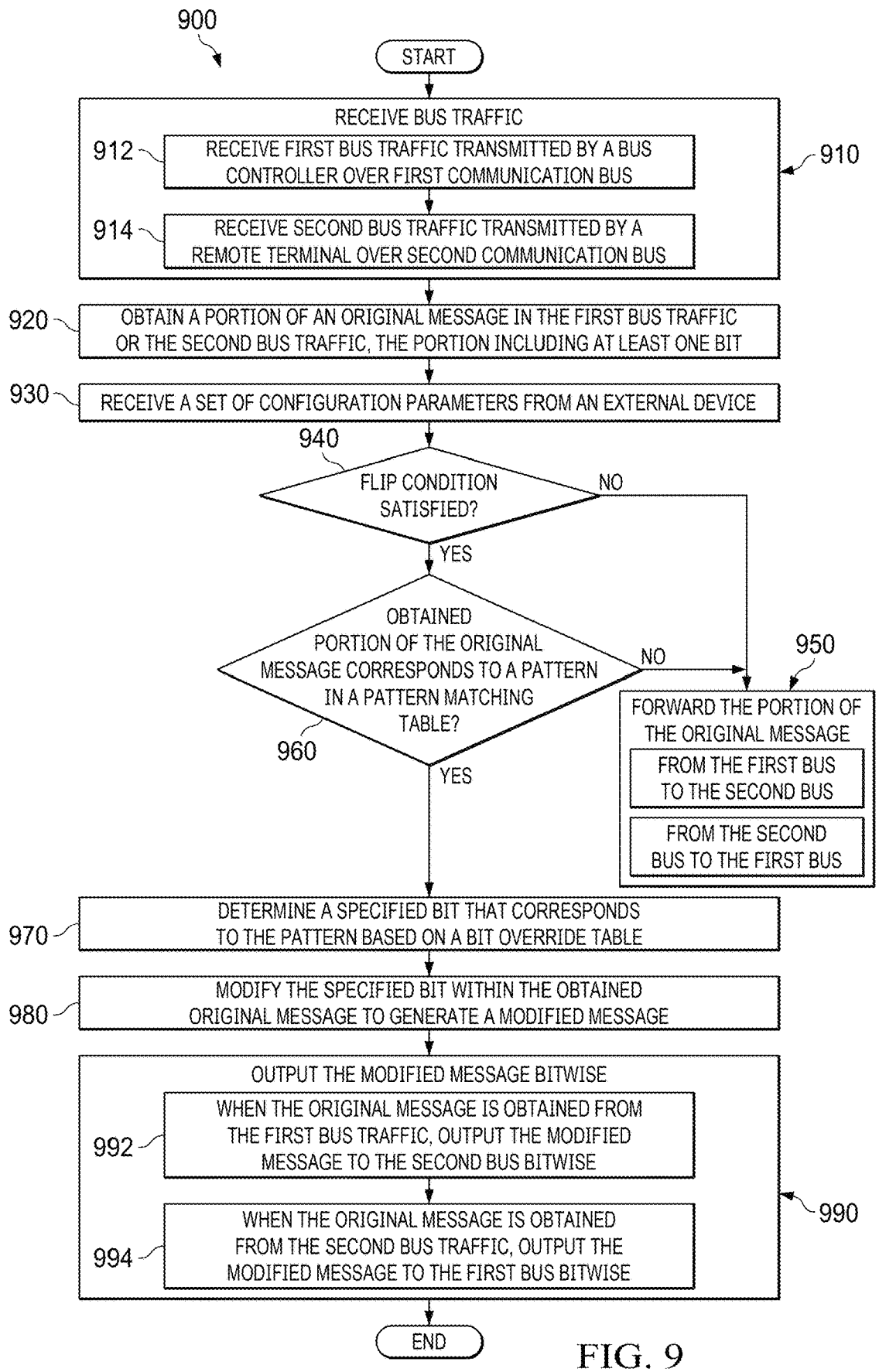
FIG. 9 illustrates an example method for using a MIL-STD-1553 injection for fault insertion and integration testing according to this disclosure.

FIG. 9 illustrates an example method 900 for using a MIL-STD-1553 injection for fault insertion and integration testing according to this disclosure. The embodiment of the method 900 shown in FIG. 9 is for illustration only, and other embodiments could be used without departing from the scope of this disclosure. The method 900 can be implemented by the injector 500 of FIG. 5, the sub-system 440 of FIG. 4, or the normal architecture 400 of FIG. 4.

At block 910, the injector 500 receives bus traffic. More particularly, at block 912, the injector 500 receives first bus traffic transmitted by a BC over a first communication bus 102. At block 914, the injector 500 receives second bus traffic transmitted by an RT over a second communication bus 402.

At block 920, the injector 500 obtains a portion of an original message 526, 528 in the first bus traffic or the second bus traffic, the portion including at least one bit.

At block 930, the injector 500 receives a set of configuration parameters 508 from an external device (such as 750 of FIG. 7). In some embodiments, the method 900 starts at block 930 followed by block 910. The set of configuration parameters 508 includes information that controls high level behavior of whether to modify a message at all, as well as data used by (e.g., needed for) the pattern matching table 510.

At block 940, the injector 500 determines whether a flip condition defined by the set of configuration parameters 508 is satisfied.

At block 950, in response to a determination that the flip condition is not satisfied, the injector 500 forwards the portion of the original message bitwise. For example, the injector 500 forwards the portion of the original 'R' message 526 from the primary bus 516 to the secondary bus 520, unmodified. Analogously, the injector 500 forwards the portion of the original 'T' message 528 from the primary bus 516 to the secondary bus 520, unmodified.

At block 960, in response to a determination that a flip condition defined by a set of configuration parameters 508 is satisfied, the injector 500 determines whether the obtained portion of the original message corresponds to the pattern in the pattern matching table 510. In response to determination that the portion of the original message does not correspond to any pattern in the pattern matching table, the injector 500 forwards (at block 950) the portion of the original message.

At block 970, in response to a determination that the portion of the obtained original message corresponds to a pattern in a pattern matching table 510, the injector 500 determines a specified bit that corresponds to the pattern based on a bit override table 512.

At block 980, the injector 500 modifies the specified bit 636 within the obtained original message to generate a modified message 530 or 532.

At block 990, the injector 500 outputs the modified message bitwise in accordance with Manchester coding. At block 992, when the original R message 526 is obtained from the first bus traffic (such as from the primary bus 102 or 516), the injector 500 outputs the modified R message 530 to the second bus (such as 402 or 520) bitwise. At block 994, when the original T message 528 is obtained from the second bus traffic (such as from the secondary bus 402 or 520), the injector 500 outputs the modified T message 532 to the first bus (such as 102 or 516) bitwise.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a first interface configured to couple to a first communication bus and to receive first bus traffic transmitted by a bus controller over the first communication bus;
a second interface configured to couple to a second communication bus and to receive second bus traffic transmitted by a remote terminal over the second communication bus; and
one or more processing devices configured to implement an injector that is configured to modify at least one of the first bus traffic and the second bus traffic received via the first interface and the second interface, respectively;
wherein, to modify at least one of the first bus traffic and the second bus traffic, the injector is configured to:
obtain a portion of an original message in the first bus traffic or the second bus traffic, the portion including at least one bit;
in response to a determination that the obtained portion of the original message corresponds to a pattern in a pattern matching table, determine a specified bit that corresponds to the pattern based on a bit override table;
modify the specified bit within the obtained original message to generate a modified message; and
output the modified message to the second communication bus bitwise when the original message is obtained from the first bus traffic or output the modified message to the first communication bus bitwise when the original message is obtained from the second bus traffic.

2. The apparatus of claim 1, further comprising:
a third interface configured to receive a set of configuration parameters from an external device;
wherein the injector is further configured to:
determine whether a flip condition defined by the set of configuration parameters is satisfied; and
in response to a determination that the flip condition is not satisfied, forward the portion of the original message bitwise.

3. The apparatus of claim 2, wherein the injector is further configured, in response to a determination that the flip condition defined by the set of configuration parameters is satisfied, to determine whether the obtained portion of the original message corresponds to the pattern in the pattern matching table.

4. The apparatus of claim 3, wherein the injector is further configured, in response to a determination that the portion of the original message does not correspond to any pattern in the pattern matching table, to forward the portion of the original message.

5. The apparatus of claim 1, wherein the first communication bus and the second communication bus are compatible with a MIL-STD-1553 protocol.

6. The apparatus of claim 1, wherein the first communication bus and the second communication bus are coupled to MIL-STD-1760 connectors, respectively.

7. The apparatus of claim 1, wherein the original message is an 'R' message or a 'T' message.

8. A method comprising:
receiving, via a first interface, first bus traffic transmitted by a bus controller over a first communication bus;
receiving, via a second interface, second bus traffic transmitted by a remote terminal over a second communication bus; and
modifying, by an injector that includes one or more processing devices, at least one of the first bus traffic and the second bus traffic received via the first interface and the second interface, respectively;
wherein modifying at least one of the first bus traffic and the second bus traffic comprises:
obtaining a portion of an original message in the first bus traffic or the second bus traffic, the portion including at least one bit;
in response to a determination that the obtained portion of the original message corresponds to a pattern in a pattern matching table, determining a specified bit that corresponds to the pattern based on a bit override table;
modifying the specified bit within the obtained original message to generate a modified message; and
outputting the modified message to the second communication bus bitwise when the original message is obtained from the first bus traffic or outputting the modified message to the first communication bus bitwise when the original message is obtained from the second bus traffic.

9. The method of claim 8, further comprising:
receiving, by a third interface, a set of configuration parameters from an external device;
determining, by the injector, whether a flip condition defined by the set of configuration parameters is satisfied; and
in response to a determination that the flip condition is not satisfied, forwarding the portion of the original message bitwise.

10. The method of claim 9, further comprising:
in response to a determination that the flip condition defined by the set of configuration parameters is satisfied, determining whether the obtained portion of the original message corresponds to the pattern in the pattern matching table.

11. The method of claim 10, further comprising:
in response to a determination that the portion of the original message does not correspond to any pattern in the pattern matching table, forwarding the portion of the original message.

12. The method of claim 8, wherein the first communication bus and the second communication bus are compatible with a MIL-STD-1553 protocol.

13. The method of claim 8, wherein the first communication bus and the second communication bus are coupled to MIL-STD-1760 connectors, respectively.

14. The method of claim 8, wherein the original message is an 'R' message or a 'T' message.

15. A non-transitory machine readable medium containing instructions that when executed cause at least one processor to:
receive, via a first interface, first bus traffic transmitted by a bus controller over a first communication bus;
receive, via a second interface, second bus traffic transmitted by a remote terminal over a second communication bus; and
modify at least one of the first bus traffic and the second bus traffic received via the first interface and the second interface, respectively;
wherein the instructions that when executed cause the at least one processor to modify at least one of the first bus traffic and the second bus traffic comprise instructions that when executed cause the at least one processor to:

obtain a portion of an original message in the first bus traffic or the second bus traffic, the portion including at least one bit;

in response to a determination that the obtained portion of the original message corresponds to a pattern in a pattern matching table, determine a specified bit that corresponds to the pattern based on a bit override table;

modify the specified bit within the obtained original message to generate a modified message; and output the modified message to the second communication bus bitwise when the original message is obtained from the first bus traffic or output the modified message to the first communication bus bitwise when the original message is obtained from the second bus traffic.

16. The non-transitory machine readable medium of claim 15, further containing instructions that when executed cause the at least one processor to:

receive, via a third interface, a set of configuration parameters from an external device;

determine whether a flip condition defined by the set of configuration parameters is satisfied; and in response to a determination that the flip condition is not satisfied, forward the portion of the original message bitwise.

17. The non-transitory machine readable medium of claim 16, further containing instructions that when executed cause the at least one processor to:

in response to a determination that the flip condition defined by the set of configuration parameters is satisfied, determine whether the obtained portion of the original message corresponds to the pattern in the pattern matching table.

18. The non-transitory machine readable medium of claim 17, further containing instructions that when executed cause the at least one processor to:

in response to a determination that the portion of the original message does not correspond to any pattern in the pattern matching table, forward the portion of the original message.

19. The non-transitory machine readable medium of claim 15, wherein the first communication bus and the second communication bus are compatible with a MIL-STD-1553 protocol.

20. The non-transitory machine readable medium of claim 15, wherein the first communication bus and the second communication bus are coupled to MIL-STD-1760 connectors, respectively.

* * * * *